United States Patent [19]
Anderson

[11] Patent Number: 5,982,059
[45] Date of Patent: *Nov. 9, 1999

[54] ELECTRIC GENERATOR AND LIGHTING ASSEMBLY

[76] Inventor: Marty J. Anderson, 303 #1 N. 10th St., Ozark, Mo. 65721

[ * ] Notice: This patent is subject to a terminal disclaimer.

[21] Appl. No.: 09/032,295

[22] Filed: Feb. 27, 1998

Related U.S. Application Data

[63] Continuation-in-part of application No. 08/797,487, Feb. 7, 1997, Pat. No. 5,793,130.

[51] Int. Cl.$^6$ .......................... H02K 21/24; H02K 15/00; F21V 31/00
[52] U.S. Cl. ................. 310/50; 310/40 MM; 310/42; 310/47; 310/48; 310/73; 310/98; 310/119; 362/120; 362/192
[58] Field of Search ................ 310/50, 40 MM, 310/67 R, 73, 98, 47, 153, 216, 254, 259; 362/249, 373, 240, 235, 80.1, 800, 61, 120, 192; 264/272.13

[56] References Cited

U.S. PATENT DOCUMENTS

| | | | |
|---|---|---|---|
| 1,607,562 | 11/1926 | Potter | 240/2 |
| 1,695,794 | 12/1928 | Becker, Jr. | 240/2 |
| 2,310,166 | 2/1943 | Way | 362/119 |
| 2,525,588 | 10/1950 | Cameron et al. | 240/2 |
| 2,852,051 | 9/1958 | Bickner | 144/136 |
| 3,573,479 | 4/1971 | Rieth | 290/1 |
| 3,590,232 | 6/1971 | Sadowski | 240/2 |
| 3,614,414 | 10/1971 | Gores | 240/2 |
| 3,742,264 | 6/1973 | Anderson et al. | 310/42 |
| 3,845,291 | 10/1974 | Portyrata | 240/26 |
| 4,280,117 | 7/1981 | Furusawa | 340/81 R |
| 4,298,910 | 11/1981 | Price | 362/35 |
| 4,462,467 | 7/1984 | Weingartner | 173/105 |
| 4,476,406 | 10/1984 | Komatsu | 340/81 R |
| 4,486,176 | 12/1984 | Tardieu et al. | 433/133 |
| 4,539,496 | 9/1985 | Thomas et al. | 340/58 |
| 4,555,656 | 11/1985 | Ryan | 320/5 |

(List continued on next page.)

FOREIGN PATENT DOCUMENTS

| | | |
|---|---|---|
| 2523891 | 9/1983 | France . |
| 3119689 A1 | 12/1982 | Germany . |

*Primary Examiner*—Thomas M. Dougherty
*Assistant Examiner*—Tran N. Nguyen
*Attorney, Agent, or Firm*—Shook, Hardy & Bacon LLP

[57] ABSTRACT

A generator and lighting assembly is provided for use on a mechanism, e.g. a power driven tool, having a shaft that is rotated during use. The assembly includes a rotor assembly 122 including a rotor shaft 102 affixed to the mechanism shaft, and a permanent magnet 132 supported on the rotor shaft for rotation therewith. A stator assembly 124 is also provided, and includes a body presenting pair of electrically conductive arms 138 extending on opposite sides of the rotor and an electrically conductive shank 140 connecting the arms together, and a winding 136 of electrically conductive wire supported on the body and presenting a pair of opposed ends. The assembly includes a lamp assembly 128 for providing illumination to an area to be lighted, and includes a light emitting diode (LED) embedded in a solid transparent bulb formed of a synthetic resin composition. Electrical conductors connect the ends of the winding to the LED to form a circuit for supplying current to the LED upon rotation of the rotor magnet 132 within the stator assembly 124.

16 Claims, 4 Drawing Sheets

U.S. PATENT DOCUMENTS

| | | | |
|---|---|---|---|
| 4,565,889 | 1/1986 | Bolson | 362/192 |
| 4,616,298 | 10/1986 | Bolson | 362/192 |
| 4,642,509 | 2/1987 | Kumada | 310/323 |
| 4,642,738 | 2/1987 | Meller | 362/119 |
| 4,777,394 | 10/1988 | Hayashi | 310/83 |
| 4,782,431 | 11/1988 | Park | 362/61 |
| 4,831,296 | 5/1989 | Nagaba | 310/86 |
| 4,908,808 | 3/1990 | Knapen et al. | 368/157 |
| 4,973,205 | 11/1990 | Spaulding | 408/16 |
| 5,241,457 | 8/1993 | Sasajima et al. | 362/80.1 |
| 5,267,129 | 11/1993 | Anderson | 362/96 |
| 5,359,500 | 10/1994 | Parker | 362/83.3 |
| 5,382,811 | 1/1995 | Takahasi | 257/88 |
| 5,412,546 | 5/1995 | Haung | 362/119 |
| 5,525,842 | 6/1996 | Leininger | 290/54 |
| 5,528,474 | 6/1996 | Roney et al. | 362/249 |
| 5,632,551 | 5/1997 | Roney et al. | 362/249 |
| 5,711,739 | 1/1998 | Hashimoto et al. | 475/254 |
| 5,793,130 | 8/1998 | Anderson | 310/50 |
| 5,808,592 | 9/1998 | Mizutani et al. | 345/83 |

ELECTRIC GENERATOR AND LIGHTING ASSEMBLY

CROSS-REFERENCE TO RELATED APPLICATIONS

The present application is a continuation-in-part of U.S. Ser. No. 08/797,487, filed Feb. 7, 1997. now U.S. Pat. No. 5,793,130

BACKGROUND OF THE INVENTION

The present invention relates generally to electric generators, and more particularly to an electric generator and lighting assembly adapted for use with pneumatic, hydraulic and electric power tools and the like.

In many manufacturing and industrial maintenance settings, pneumatic, hydraulic and electric tools are used to construct and repair products. In these settings, frequently a worker is required to access a small, hard to reach place that is out of the line of normal illumination of conventional manufacturing area lighting. It is common for the worker to carry a separate DC or AC powered, hand-held light in order to provide additional lighting of the immediate work area.

However, because conventional lighting devices typically must be hand-held, the worker may quickly become tied up between handling the tool and the light while also positioning herself and the work piece in a proper orientation. Further, because pneumatic, hydraulic and electric power is already commonly available in the work place for use in powering the tools typically used, the provision of a separate DC or AC power source in addition to the lines already present represents unnecessary duplication of power lines in the work area which inhibits movement of workers and reduces their efficiency.

Another disadvantage to using most presently available DC powered lighting devices is environmental in nature, and relates to the problem of disposal of batteries and the like which are used to supply the power for such devices. It would be desirable to provide a lighting assembly that does not adversely affect the environment and that is powered by already available means typically present in a manufacturing or maintenance environment.

BRIEF SUMMARY OF THE INVENTION

It is an object of the present invention to provide a generator and lighting assembly which can be used in association with electric, hydraulic and pneumatic tools in order to provide focused light onto the immediate area surrounding the point at which work is being done or at which a tool is directed, wherein the lighting assembly is powered indirectly by the mechanical movement of the tool rather than by a separate external source of energy.

It is another object of the invention to provide an assembly which can be used with electric, hydraulic, and pneumatic tools in order to provide a collateral source of electric power on the tools that is available for use in any desired manner, such as for charging a DC power supply or for powering any other desired electric implement.

Yet another object of the invention is to provide a generator and lighting assembly that is of a size appropriate for receipt on the end of an electric, hydraulic or pneumatic tool, and does not present a large profile that would otherwise interfere with use and operation of the tool.

In accordance with these and other objects evident from the following description of a preferred embodiment of the invention, an electric generator and lighting assembly is provided for use on a power-driven tool. The assembly includes a rotor in the form of a permanent magnet affixed to a rotary output shaft of the tool, and a stator within which the rotor is received. The stator includes a pair of electrically conductive arms extending on opposite sides of the rotor, an electrically conductive shank connecting the arms together, and a winding of electrically conductive wire presenting a pair of opposed ends. A lamp is connected to the ends of the winding so that the lamp is powered upon rotation of the rotor within the stator. A housing supports the stator on the output shaft of the tool, and includes a means for securing the housing in place on the tool and a positioning means for positioning the stator relative to the magnet of the rotor to prevent contact between the stator and the magnet during rotation of the output shaft.

By providing a generator and lighting assembly in accordance with the present invention, numerous advantages are realized. For example, by housing the stator around the rotor, a compact construction results which provides focused light onto the immediate area surrounding the point at which work is being done or at which the tool is directed. In addition, because the assembly uses the rotation of the output shaft of the tool to generate the necessary electricity to power the lamp, it is not necessary to employ an external or secondary power source or a separate switch for the lamp.

According to another aspect of the invention, the generator can alternately be used to power a battery charger or other mechanism, and can employ an extension cord, drop cord or the like to supply electricity from the implement to a lamp or other remote electrical implement to be powered.

Yet another aspect of the invention involves providing a generator and lighting assembly in which the rotor includes a rotor shaft affixed to the drive shaft of the tool, and the permanent magnet is supported on the rotor shaft for rotation therewith. By providing this construction, the assembly can be easily installed on an existing tool without requiring modification or extensive reconstruction of the tool. Thus, the invention can be put to use not only on new tools, but on the large number of existing tools as well.

The assembly of the invention preferably employs a lamp construction that includes a light emitting diode (LED) embedded in a solid transparent bulb formed of a synthetic resin composition. By employing this specific type of lamp, a construction is presented that is shock and impact resistant, enabling its use in rough industrial environments such as in manufacturing and maintenance facilities. Further, because this type of lamp is impact resistant, it need be replaced less frequently than filament-type lamps having hollow glass bulbs.

BRIEF DESCRIPTION OF THE SEVERAL VIEWS OF THE DRAWING

The preferred embodiment of the present invention is described in detail below with reference to the attached drawing figures, wherein.

DETAILED DESCRIPTION OF THE INVENTION

Figure 2:
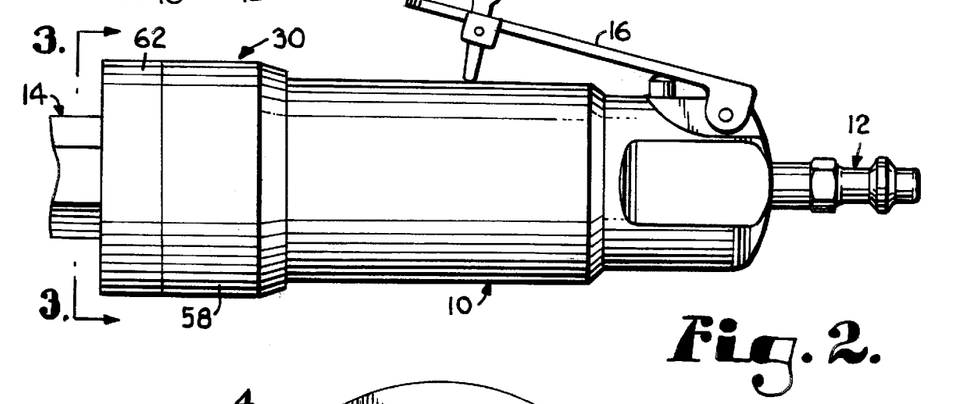
FIG. 2 is a side elevational view of the grinder.
Figures 4, 5, 6, 7:
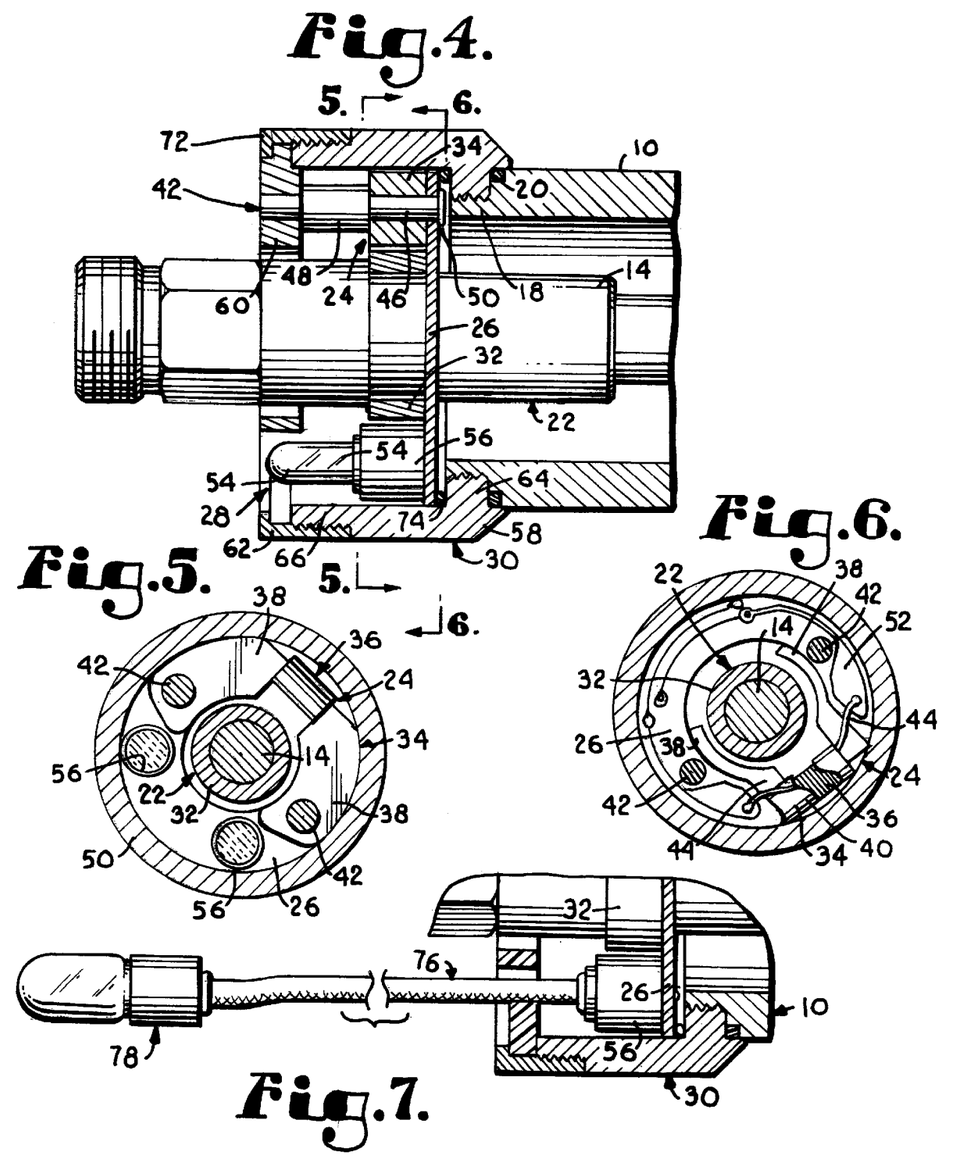
FIG. 4 is a sectional view taken along line 4—4 of FIG. 3.
FIG. 5 is a sectional view taken along line 5—5 of FIG. 4.
FIG. 6 is a sectional view taken along line 6—6 of FIG. 4.
FIG. 7 is a fragmentary sectional view similar to FIG. 4, illustrating a drop light forming a part of the assembly.

A straight die pneumatic grinder is shown in FIG. 2, which incorporates a grinder and lighting assembly constructed in accordance with a first species of the preferred embodiment of the invention. The grinder includes an elongated body 10 presenting proximal and distal ends, a coupling 12 at the proximal end of the body for coupling the tool to a conventional source of pressurized air, and a rotary output shaft 14 protruding from the distal end of the body and sized for receipt of a rotary grinder. A hand-actuated lever 16 is mounted on the body for actuating a valve that supplies pneumatic pressure to the tool to drive rotation of the output shaft. The body 10 is cylindrical, and as shown in FIG. 4, presents an externally threaded section 18 at the distal end for receiving the assembly. In addition, a small stepped groove is formed in the exterior of the body adjacent the threaded section for receiving an o-ring 20.

Although the preferred embodiment of the invention is described with reference to a pneumatic grinder, it is understood that the invention can likewise be employed with any other type of pneumatic, hydraulic or electric tool, or any other mechanism, without limitation, so long as the tool or mechanism includes a driven rotary shaft from which mechanical energy can be drawn by the assembly for use in generating electricity.

Figure 1:
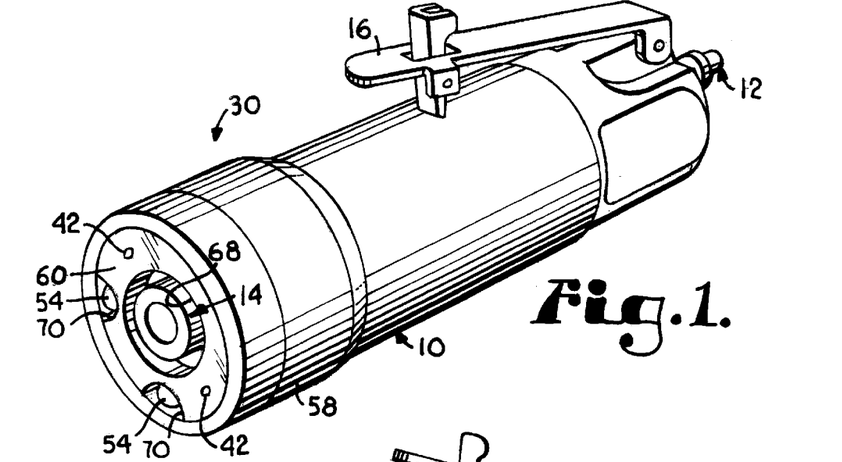
FIG. 1 is a perspective view of a straight die pneumatic grinder incorporating a generator and lighting assembly constructed in accordance with a first species of the preferred embodiment.

The generator and lighting assembly broadly includes a rotor assembly 22, a stator assembly 24, a support plate 26, a pair of lamp assemblies 28, and a housing assembly 30. As illustrated in FIG. 1, the entire assembly is sized for receipt on the distal end of the tool such that focused light can be directed onto the immediate area surrounding the point at which work is to be done or at which the tool is directed. Although the diameter of the housing assembly 30 is somewhat greater than that of the tool body in the preferred embodiment, it presents a low profile that does not obstruct the user's view of the grinder, and does not interfere with handling of the tool.

The rotor assembly 22 is shown in FIG. 4, and includes the rotary output shaft 14 of the tool, and an annular permanent magnet 32 that is affixed to the shaft adjacent the distal end of the tool. The shaft 14 is preferably somewhat longer than a conventional output shaft in order to accommodate the magnet 32, but is otherwise conventional, including a proximal end that is connected to an internal drive assembly of the tool and a distal end that is threaded for receipt of a conventional grinder or the like. The magnet includes an inner surface that is affixed to the shaft, e.g. by an adhesive or the like, and an outer cylindrical surface. Alternately, a plurality of magnets may be provided around the circumference of the rotary shaft of the tool in place of the single magnet shown.

As shown in FIG. 5, the stator assembly 24 includes a C-shaped stator element 34 formed of an electrically conductive material, and a winding 36 of copper wire or other suitable conductor. The stator element 34 includes a body presenting a pair of arcuate arms 38 extending on opposite sides of the rotor, and a shank 40, as shown in FIG. 6, extending between and connecting the arms together. The arms 38 include opposed inner circumferential surfaces defining a diameter slightly larger than the diameter defined by the magnet 32 on the shaft so that the rotor is received between and spaced from the opposing inner circumferential surfaces of the arms. In addition, a pair of diametrically opposed holes are formed in the arms and extend axially through the stator element for receiving pins 42 that position the stator element within the housing assembly and maintain the spacing between the stator element 34 and the magnet 32.

The winding 36 is coiled around the shank of the stator element 34 and presents a pair of wire ends 44 across which current flows when the rotor is rotated within the stator. The size of the wire and the number of turns is variable, and can be selected by one of ordinary skill in the art to obtain a desired current from the assembly. In an exemplary embodiment, 250 winds of a 31 wire are employed. A sleeve of heat-shrinkable protective material is preferably received over the winding to protect the winding from debris generated by the tool.

The support plate 26 is generally C-shaped, presenting a pair of opposed free ends that extend beneath the arms of the stator element 34 and terminate adjacent the shank and winding. The support plate 26 is formed of an electrically insulative material typical of those used in the manufacture of circuit boards, such as a synthetic resin or the like. The plate is generally planer, presenting opposed, axially spaced first and second side surfaces. A central cutout is defined by the plate that is of a diameter slightly larger than the diameter defined by the arms of the stator element such that the arms protrude radially into the cutout area of the support plate.

As illustrated in FIG. 4, the stator element is secured to the first surface of the support plate 26 by the pins 42. Preferably, the pins each include a reduced diameter section 46 that is received in one of the holes in the stator element, and enlarged diameter sections 48, 50 are formed on either end of the section for sandwiching the stator element and support plate together. The end section 50 of each pin 42 is preferably formed of the same diameter as that of the reduced diameter section so that the pin can be inserted into the stator element and support plate during assembly. The end 50 is then staked or otherwise deformed to hold the stator element and support plate together. As such, the pins are actually rivets. However, other suitable conventional fastening expedients could alternately be used.

As shown in FIG. 6, a circuit 52 is printed or otherwise applied to the second surface of the support plate 26 for providing an electrical connection between the winding ends 44 and the lamp assemblies 28. The circuit includes large pads adjacent the free ends of the plate, and the wire ends 44 are soldered or otherwise connected to these pads in a conventional manner. The large size of the pads simplifies fabrication of the assembly. The circuit also includes smaller pads located beneath each of the lamp assemblies for supplying power to the lamp assemblies during rotation of the shaft. Holes are formed in the support plate within each of the smaller pads so that wire connectors from the lamp assemblies can be passed through the plate and soldered or otherwise connected to the pads. As such a complete circuit is defined for providing power to the lamp assemblies.

Returning to FIG. 4, the lamp assemblies 28 are identical to one another, and each includes a filament-type lamp 54 and a socket 56 sized for receipt of the lamp. Alternately, it is possible to employ a lamp having an LED embedded in a solid transparent bulb of synthetic resin material. By providing this type of lamp, a shatter-proof design results which is capable of standing up to use in tough environments such as industrial manufacturing and maintenance settings. Each lamp, regardless of the type used, preferably includes a base sized for receipt in the socket and presenting a pair of electrical connectors adapted to be coupled with the conductors of the assembly. As such, the lamps are replaceable.

Each socket is generally cylindrical, presenting a bottom end that is secured to the first side surface of the support plate 26, e.g. by an adhesive or the like, and an open, upper free end within which one of the lamps is received. The wire connectors of the socket extend through the support plate and are soldered to the small pads of the circuit as described above.

As shown in FIG. 1, the housing assembly broadly includes an elongated tubular body 58 presenting proximal and distal ends, a face plate 60 adapted to fit within the distal end of the body, and a retainer 62 for securing the face plate and lens in place. With reference to FIG. 4, the body presents radially opposed inner and outer circumferential surfaces, and the inner surface is of a diameter sized for receipt over the distal end of the body 10 of the tool. A section 64 of the inner circumferential surface is stepped to present a reduced diameter relative to the remainder of the body, and the reduced diameter section is threaded to mate with the threaded section 18 of the tool body 10. As such, the threaded section 64 defines a means for securing the housing in place on the tool. Any other conventional fastening expedient could be used in place of the threaded connection shown in the preferred embodiment. The outer circumferential surface of the housing includes a section 66 at the distal end of the body that is threaded to receive the retainer 62.

Figure 3:
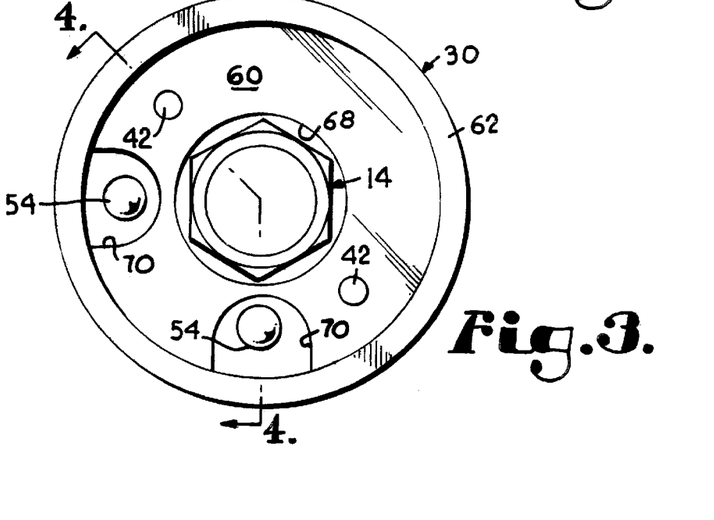
FIG. 3 is a sectional view taken along line 3—3 of FIG. 2.

The face plate is shown in FIG. 3, and is generally circular, presenting axially opposed, planer side faces, and including a central aperture 68 sized for receipt of the output shaft of the tool, and a pair of cutouts 70, as shown in FIG. 4, aligned with the lamps 54. In addition, the face plate 60 includes a pair of apertures through which the pins 42 extend. Although the face plate, retainer and housing body are formed of aluminum in the preferred embodiment, they can also be formed of any other suitable material. For example, the face plate can be constructed of a transparent material such as a transparent synthetic resin material, and the other components of the housing assembly can be constructed of any synthetic resin or other suitable material. As shown in FIG. 4, the outer circumferential edge of the face plate is stepped for receipt in the body 58 so that the face plate is held in place on the body upon assembly.

The retainer 62 is ring-shaped, and presents a threaded inner surface that mates with the threaded section 66 of the body and an inwardly directed flange 72 that engages the face plate to hold the retainer and face plate on the body. The body 58, retainer 62 and face plate 60 of the housing assembly 30 are thus fixed in place on the tool and, together with the pins 42, function to position the stator assembly 24 relative to the magnet 32 of the rotor and to prevent contact between the stator element and the magnet during rotation of the output shaft.

As discussed above, the o-ring 20 is received in the proximal end of the housing body 58 adjacent the stepped section 64, and is received in the stepped groove of the body 10 of the tool. The o-ring 20 absorbs vibration during operation of the tool to prevent the housing from coming unscrewed from the tool body. In addition, the o-ring permits a limited range of adjustment in the rotational position of the housing relative to the tool body so that the lamps can be positioned relative to the output shaft. In this manner, the illumination pattern of the assembly can be adjusted about the shaft 14 of the tool.

A second o-ring 74 is fitted in the housing adjacent the opposite axial end of the stepped section 64, opposite the o-ring 20, and functions as a compression spring to accommodate variations in the dimensions of the support plate 26 and stator element 34 within the housing, and to apply pressure on the support plate and stator assembly to hold them in place within the housing without contacting with the magnet 32.

The generator and lighting assembly can either be provided as a retrofit assembly that is assembled on a tool during or subsequent to manufacture, or as an integral part of the original tool design. If constructed as a retrofit, the housing assembly 30 will include a means as shown and described herein for securing the housing to the body of the tool. However, where the assembly is designed into the tool, there is no need for a separate housing for the generator and lighting assembly, and the functions performed by the housing assembly of the preferred embodiment are designed into the tool body.

In operation, when power is supplied to the tool, the output shaft 14 rotates, causing the magnet 32 to rotate within the stator assembly 24, generating a current in the winding 36 that supplies an electric current across the wire ends 44. This current is supplied through the circuit 52 on the support plate 26 to the socket leads, and powers the lamps to illuminate the area immediately in front of the distal end of the tool. When power to the tool is cut off, the shaft stops rotating and current through the winding falls off so that the lamps go dark. Thus, In order to energize the lamps, the tool must be powered.

If desired, the generator can be used to provide power for uses other than lighting the lamps. For example, the generator can be connected, via a transformer, to a battery charger located either internally or externally of the tool for charging replacement batteries. By providing this construction, the batteries could be used either in the tool itself, e.g. where the tool is an electric tool that is convertible for use with either AC or DC power, or in other tools that require a DC power source, such as a radio, drop light or the like. Likewise, the generator could be employed with an extension cord 76, as shown in Fig. 7, so that electricity can be supplied to a remote drop light 78 or other implement, as desired.

Figures 8, 9, 10:
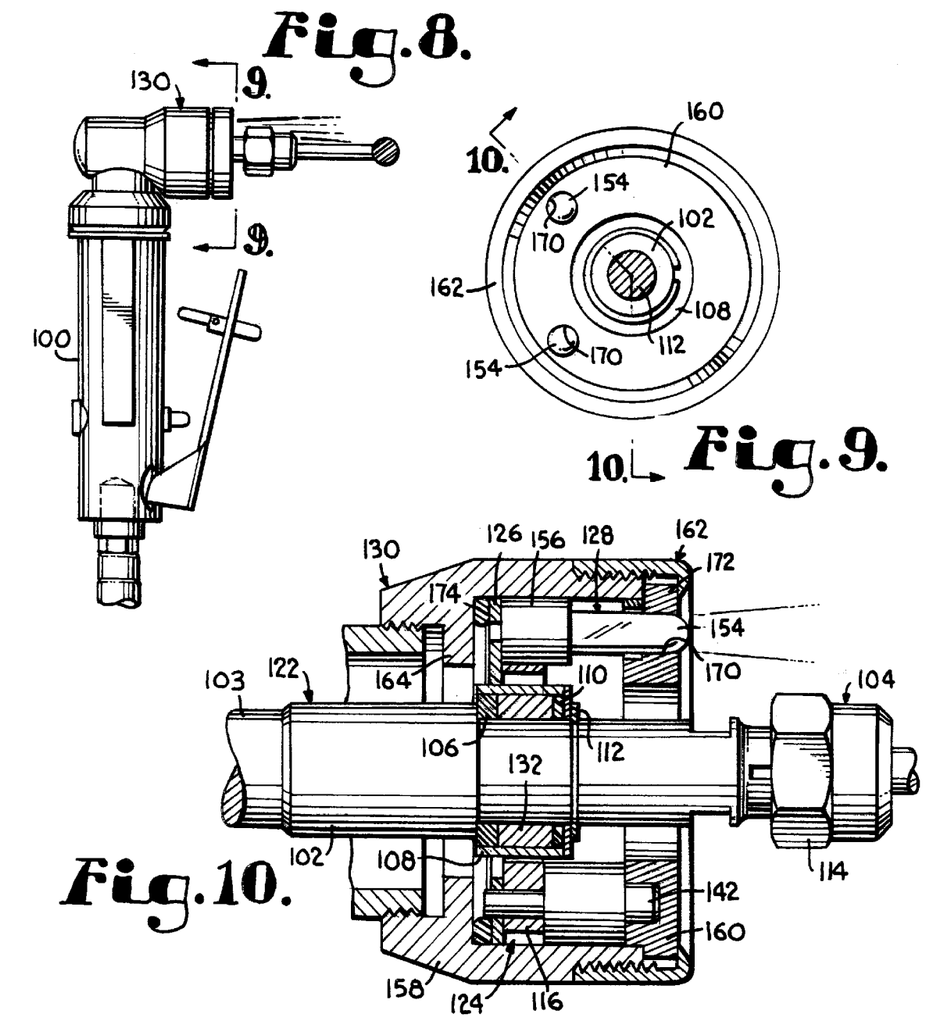
FIG. 8 is a side elevational view of a 90 degree die pneumatic grinder incorporating a generator and lighting assembly constructed in accordance with a second species of the preferred embodiment.
FIG. 9 is a sectional view taken along line 9—9 of FIG. 8.
FIG. 10 is a sectional view taken along line 10—10 of FIG. 9.

A second species of the present invention is illustrated in FIGS. 8–13. With reference to FIG. 8, a 90 degree die pneumatic grinder 100 is shown which incorporates a grinder and lighting assembly. The grinder includes an elongated body presenting proximal and distal ends, a coupling at the proximal end of the body for coupling the tool to a conventional source of pressurized air, and a rotary output shaft protruding from the distal end of the body. A hand-actuated lever is mounted on the body for actuating a valve that supplies pneumatic pressure to the tool to drive rotation of the output shaft. The body is cylindrical, presenting an elbow at the distal end having an externally threaded section for receiving the assembly.

The generator and lighting assembly is shown in FIG. 10, and broadly includes a rotor assembly 122, a stator assembly 124, a support plate 126, a pair of lamp assemblies 128, and a housing assembly 130. As illustrated in FIG. 8, the entire assembly is sized for receipt on the distal end of the tool 100 such that focused light can be directed onto the immediate area surrounding the point at which work is to be done or at which the tool is directed. Although the diameter of the housing assembly 130 is somewhat greater than that of the tool body in the preferred embodiment, it presents a low profile that does not obstruct the user's view of the grinder, and does not interfere with handling of the tool.

Figure 13:
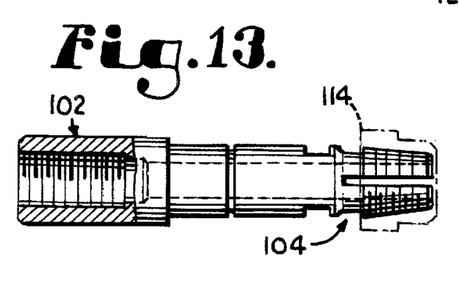
FIG. 13 is a side elevational view of a rotor shaft forming a part of the second species of the generator and lighting assembly of the preferred embodiment.

The rotor assembly 122 is shown in FIG. 10, and includes a rotor shaft 102 on which a permanent magnet 132 is supported. As shown in FIG. 13, the rotor shaft 102 is preferably a tubular steel collet, and includes an internally threaded proximal end sized for receipt on the end of the drive shaft 103 of the tool so that the drive shaft and rotor shaft rotate together when the tool is actuated. A chuck 104 is formed at the distal end of the rotor collet for receiving a tool bit such that the rotor shaft essentially defines an extension of the drive shaft of the tool.

The collet includes a large-diameter section adjacent the proximal end thereof and a small-diameter section adjacent thereto. A shoulder is presented at the step between the sections and a circumferential groove is formed in the collet at a position spaced axially from the shoulder by a distance sufficient to receive the magnet 132, a washer 106, a magnet shield 108, and a resilient o-ring 110, as illustrated in FIG. 10.

The magnet 132 can be formed of any suitable magnetic material, a preferred example of which is a NbFeB-40 magnet known to have excellent magnetic properties. The magnet is annular in shape, presenting an inner diameter sized for receipt on the small-diameter section of the collet, an opposed outer diameter. As an alternate construction to the illustrated embodiment, a plurality of magnets could be used on the rotor shaft in place of the single magnet shown.

The washer 106 is preferably formed of a non-magnetic material such as stainless steel, aluminum or the like, and functions to provide an air gap between the magnet and the large-diameter section of the collet so that the magnetic flux of the magnet jumps to the stator rather than along the collet into the tool. As such, the washer improves the magnetic properties of the rotor assembly, providing more power than would otherwise be generated. The shield 108 is also preferably formed of a non-magnetic material, and is generally cup shaped, presenting an annular end face having an inner diameter sized for receipt on the small-diameter section of the collet and a circumferentially extending side face that covers the magnet to prevent fragments of the magnet from being thrown from the assembly in the event the magnet disintegrates during operation. The circumferential face of the shield includes an axial dimension greater than the axial dimension of the magnet such that the shield covers the magnet, the washer 106 and the o-ring 110. As such, the o-ring can be interposed between the magnet and the shield to hold the magnet in place on the collet for rotation therewith.

In order to assemble the magnet 132 on the collet, the washer 106, magnet, o-ring 110 and shield 108 are received on the collet in sequence, and a retainer ring 112 is fitted in the circumferential groove of the collet to hold the elements in place. An adhesive is not necessary in this species of the invention, and the construction enables disassembly of the rotor assembly in order to permit replacement of the magnet, if necessary.

As shown in FIG. 13, the distal end of the collet is tapered and includes external threads that are sized for receipt of a nut 114 forming a part of the chuck 104. The collet is split longitudinally into halves along the length of the chuck to facilitate gripping of a tool bit upon tightening of the nut. In addition, flats are provided adjacent the distal end of the collet for receiving a tool that permits gripping of the collet during rotation of the nut. By providing this construction, a chuck is presented that is substantially similar to a conventional chuck normally attached to the end of the drive shaft of the tool.

Figure 11:
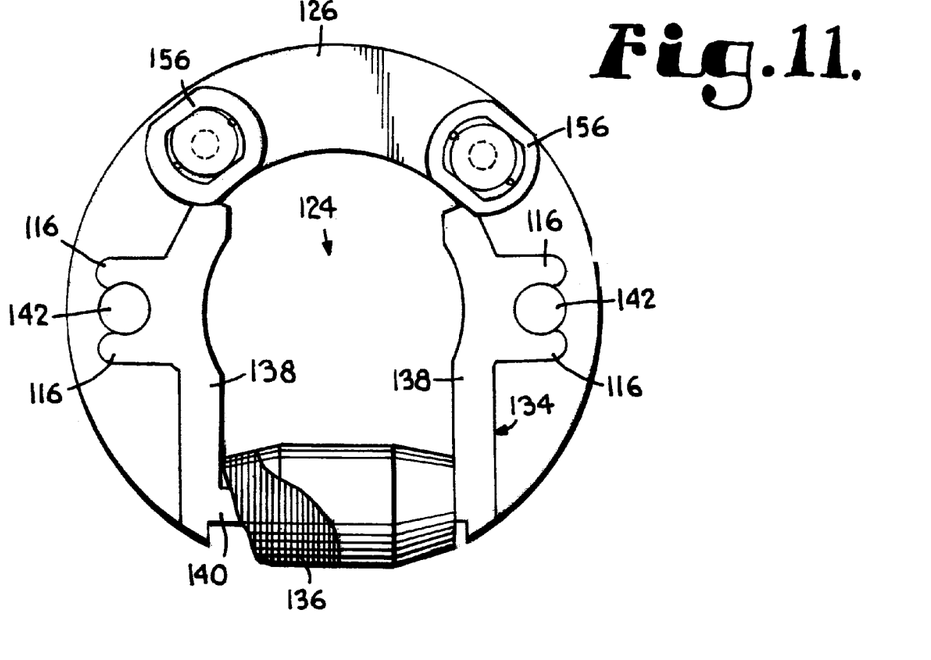
FIG. 11 is a sectional view taken along line 11—11 of FIG. 10.

As shown in FIG. 11, the stator assembly 124 includes a C-shaped stator element 134 formed of an electrically conductive material, and a winding 136 of copper wire or other suitable conductor. The stator element 134 includes a body presenting a pair of arms 138 extending on opposite sides of the rotor, and a shank 140 extending between and connecting the arms together. The arms 138 include opposed arcuate segments presenting inner circumferential surfaces defining a diameter slightly larger than the diameter defined by the magnet shield of the rotor assembly so that the magnet 132 is received between and spaced from the opposing inner circumferential surfaces of the arms, as shown in FIG. 10. In addition, returning to FIG. 11, a pair of radially extending ears 116 are formed in each of the arms for receiving pins 142 that position the stator element within the housing assembly and maintain the spacing between the stator element 134 and the shield.

The winding 136 is coiled around the shank of the stator element 134 and presents a pair of wire ends across which current flows when the rotor is rotated within the stator. The size of the wire and the number of turns is variable, and can be selected by one of ordinary skill in the art to obtain a desired current from the assembly. A sleeve of heat-shrinkable protective material is preferably received over the winding to protect the winding from debris generated by the tool.

Figure 12:
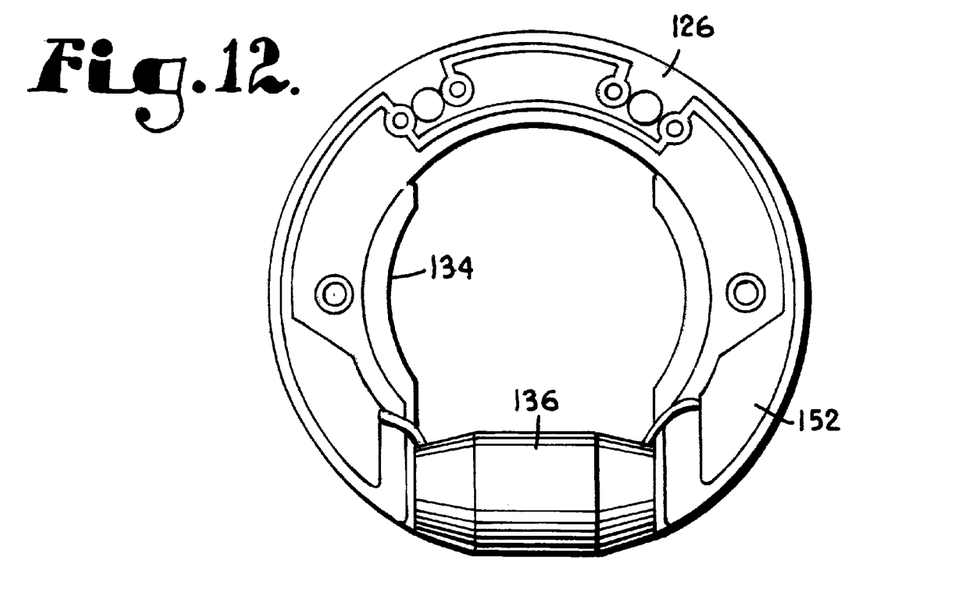
FIG. 12 is a sectional view taken along line 12—12 of FIG. 10.

The support plate 126 is shown in FIG. 12, and is generally C-shaped, presenting a pair of opposed free ends that extend beneath the arms of the stator element 134 and terminate adjacent the shank and winding. The support plate 126 is formed of an electrically insulative material typical of those used in the manufacture of circuit boards, such as a synthetic resin or the like. The plate is generally planer, presenting opposed, axially spaced first and second side surfaces. A central cutout is defined by the plate that is of a diameter slightly larger than the diameter defined by the arms of the stator element such that the arms protrude radially into the cutout area of the support plate.

As illustrated in FIG. 10, the stator element is secured to the first surface of the support plate 126 by the pins 142. Preferably, the pins each include an enlarged-diameter intermediate region and a pair of reduced-diameter end sections. One of the end sections is sized for receipt in a recess of a face plate 160 forming a part of the housing assembly 130, described below, and holds the pin in place relative to the housing assembly. The other reduced-diameter section of each pin 142 is received between one of the pairs of ears 116 of the stator element and extends through the support plate 126. The proximal end section of each pin 142 can be inserted into the stator element and support plate during assembly. The end is then staked or otherwise deformed to hold the stator element and support plate together. As such, the pins are actually rivets. However, other suitable conventional fastening expedients could alternately be used.

The enlarged-diameter intermediate region of each pin 142 presents a pair of axially spaced shoulders, one of which engages the face plate 160 of the housing assembly 130 and the other of which engages the ears 16 of the stator element. As such, the pins space the stator element and support plate from the face plate and position the stator element in axial alignment with and radially outward of the magnet 132 of the rotor assembly 122.

As shown in FIG. 12, a circuit 152 is printed or otherwise applied to the second surface of the support plate 126 for providing an electrical connection between the winding ends and the lamp assemblies 128. The circuit includes large pads adjacent the free ends of the plate, and the winding ends are soldered or otherwise connected to these pads in a conventional manner. The large size of the pads simplifies fabrication of the assembly. The circuit also includes smaller pads located beneath each of the lamp assemblies for supplying power to the lamp assemblies during rotation of the shaft. Holes are formed in the support plate within each of the smaller pads so that wire connectors from the lamp assemblies can be passed through the plate and soldered or otherwise connected to the pads. As such a complete circuit is defined for providing power to the lamp assemblies.

Returning to FIG. 10 the lamp assemblies 128 are identical to one another, and each includes a lamp 154 and a socket 156 sized for receipt of the lamp. Although it is possible to employ a lamp having a filament supported within a hollow glass bulb, it is preferred that a special type of lamp be employed which includes an LED embedded in a solid transparent bulb of synthetic resin material. By providing this type of lamp, a shatter-proof design results which is capable of standing up to use in tough environments such as industrial manufacturing and maintenance settings. Each lamp, regardless of the type used, preferably includes a base sized for receipt in the socket 156 and presenting a pair of electrical connectors adapted to be coupled with the conductors of the assembly. In the illustrated embodiment, the base is a wedge base of known construction. As such, the lamps are replaceable.

As shown in FIG. 11, each socket 156 is generally oblong, presenting a bottom end that is secured to the first side surface of the support plate 126, e.g. by an adhesive or the like, and an open, upper free end within which one of the lamps is received. The wire connectors of the socket extend through the support plate and are soldered to the small pads of the circuit as described above.

Returning to FIG. 10, the housing assembly 130 broadly includes an elongated tubular body 158 presenting proximal and distal ends, the face plate 160 adapted to fit within the distal end of the body, and a retainer 162 for securing the face plate in place. Preferably, a linear polyoxymethylene-type acetal resin, such as that marketed under the trade name DELRIN, or any other suitable synthetic resin material is used to form the body so that it will not bend upon impact or become overheated. The body presents radially opposed inner and outer circumferential surfaces, and the inner surface is of a diameter sized for receipt over the distal end of the body of the tool. An intermediate section 164 of the inner circumferential surface is stepped to present a reduced diameter relative to the remainder of the body, and the inner surface of the body is threaded at the proximal end to mate with the threaded section of the tool body. Any other conventional fastening expedient could be used in place of the threaded connection shown in the preferred embodiment. The outer circumferential surface of the housing includes a threaded section at the distal end of the body to receive the retainer 162.

The face plate 160 is shown in FIG. 9, and is generally circular, presenting axially opposed, planer side faces, and including a central aperture sized for receipt of the collet of the rotor assembly, and a pair of holes 170 aligned with the lamps 154. In addition, the face plate 160 includes a pair of recesses extending into the face plate from the interior of the assembly for receiving the positioning pins 142. Although the face plate, retainer and housing body are formed of a synthetic resin material in the preferred embodiment, they can also be formed of any other suitable material. For example, the face plate can be constructed of a transparent material such as a transparent synthetic resin material. As shown in FIG. 10, the outer circumferential edge of the face plate is stepped for receipt in the body 158 so that the face plate is held in place on the body upon assembly.

The retainer 162 is ring-shaped, and presents a threaded inner surface that mates with the threaded distal section of the body and an inwardly directed flange 172 that engages the face plate to hold the retainer and face plate on the body. The body 158, retainer 162 and face plate 160 of the housing assembly 130 are thus fixed in place on the tool and, together with the pins 142, function to position the stator assembly 124 relative to the magnet 132 of the rotor and to prevent contact between the stator element and the magnet during rotation of the output shaft.

An o-ring 174 is fitted in the housing between the stepped section 164 and the support plate, and functions as a compression spring to accommodate variations in the dimensions of the support plate 126 and stator element 134 within the housing. In addition, the o-ring applies pressure on the support plate and stator assembly to hold them in position within the housing in a spaced relationship to the magnet 132.

In operation, when power is supplied to the tool, the output shaft rotates, causing the magnet 132 to rotate within the stator assembly 124, generating a current to the lamps to illuminate the area immediately in front of the distal end of the tool. When power to the tool is cut off, the shaft 102 stops rotating and current through the winding falls off so that the lamps go dark. Thus, unless capacitors or rechargeable batteries are included in the circuit as is envisioned within the scope of the present invention, the lamps are only energized while the tool is being operated.

The LED lamps illustrated in FIG. 9 are longer than comparable filament-type lamps, and extend completely through the holes 170 in the face plate 160 so that light emitted by the lamps is projected onto the area immediately ahead of the assembly. Because the LED lamps have a 45 degree angle of illumination, this construction provides improved illumination of the work area. Alternately, if a filament-type lamp is used, it extends into the hole 170 in the face plate 160, but not completely through it. As such, the hole 170 acts as a reflector to direct the light on the area immediately ahead of the assembly. Either type of lamp can be used in the illustrated embodiment, and the construction of the housing assembly facilitates the use of either type.

If desired, the generator can be used to provide power for uses other than lighting the lamps. For example, the generator can be connected, via a transformer, to a battery charger located either internally or externally of the tool for charging replacement batteries. By providing this construction, the batteries could be used either in the tool itself, e.g. where the tool is an electric tool that is convertible for use with either AC or DC power, or in other tools that require a DC power source, such as a radio, drop light or the like. Likewise, the generator shown in FIGS. 8–13 could be employed with an extension cord 76, as shown in Fig. 7, so that electricity can be supplied to a remote lamp or other implement, as desired.

Figure 14:
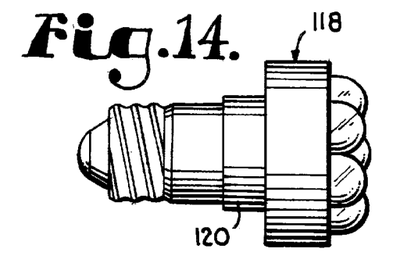
FIG. 14 is a side elevational view of a lamp capable of use in the generator and lighting assembly of the present invention.

In addition, as shown in FIG. 14, a unique lamp 118 can be employed which includes a plurality of LEDs supported on a single base 120. According to this construction, each LED is embedded in a solid bulb of transparent synthetic resin material, and all of the bulbs are supported on a single base that is threaded for receipt in a socket of the type shown in FIG. 7. By employing a lamp of this type directly in the assembly or in combination with the extension cord, it is possible to provide substantial illumination to any area adjacent to or remote from the tool.

Although the miniature generator and lighting assembly of the preferred embodiment is disclosed with reference to tools, it can also be used on other mechanisms in which a driver rotary shaft is available for supporting and rotating the magnet within the stator assembly. As such, although the present invention has been described with reference to the preferred embodiment, it is noted that equivalents may be employed and substitution made herein without departing from the scope of the invention as recited in the claims.

I claim:

1. A miniature electric generator and lighting assembly for a power-driven tool, wherein the tool includes a tool housing and a drive shaft that is rotatable relative to the tool housing, the assembly comprising:

a rotor including a rotor shaft affixed to the drive shaft of the tool, and a permanent magnet supported on the rotor shaft for rotation therewith;

a stator including a stator body presenting pair of electrically conductive arms extending on opposite sides of the rotor and an electrically conductive shank connecting the arms together, and a winding of electrically conductive wire supported on the body and presenting a pair of opposed ends;

a lamp including a light emitting diode (LED) embedded in a solid transparent bulb formed of a synthetic resin composition;

electrical conductors connecting the ends of the winding to the LED to form a circuit for supplying current to the LED upon rotation of the rotor within the stator; and an assembly housing secured to the tool housing for supporting the stator and the LED on the tool.

2. A miniature electric generator and lighting assembly as recited in claim 1, wherein the rotor shaft presents a proximal end adapted to be secured to the drive shaft of the tool and a distal end presenting a chuck.

3. A miniature electric generator and lighting assembly as recited in claim 1, wherein each arm of the stator body includes a pair of radially extending ears, the assembly further comprising a pair of positioning pins that are supported by the assembly housing and engage the ears of each arm of the stator body to prevent contact between the stator and the permanent magnet during rotation of the rotor shaft.

4. A miniature electric generator and lighting assembly as recited in claim 1, wherein a plurality of lamps are provided, each including an LED embedded in a solid transparent bulb formed of a synthetic resin composition, and each including a base presenting a pair of electrical contacts adapted to be connected to the electrical conductors of the assembly.

5. A miniature electric generator and lighting assembly as recited in claim 1, further comprising a support plate including a central cutout sized for receipt of the rotor shaft and first and second axially opposed, generally planer side surfaces, the stator being secured to the first surface of the support plate so that the support plate and stator are together positioned within the assembly housing.

6. An assembly as recited in claim 5, wherein the support plate is formed of an electrically insulative material, the electrical conductors including a printed circuit applied to the second surface of the support plate.

7. An assembly as recited in claim 6, further comprising a socket secured to the support plate and presenting a pair of terminals connected to the printed circuit, the lamp including a base sized for receipt in the socket and presenting a pair of electrical contacts adapted to be connected to the electrical conductors of the assembly.

8. An assembly as recited in claim 1, wherein the assembly housing includes a tubular body presenting proximal and distal ends, radially opposed inner and outer surfaces, and a threaded section provided on the inner surface.

9. An assembly as recited in claim 8, wherein the assembly housing body includes a step protruding radially inward from the inner surface adjacent the threaded section for positioning the stator axially within the assembly.

10. An assembly as recited in claim 9, further comprising an 0-ring interposed between the stator and the step, the 0-ring being formed of a material that is resilient relative to the housing.

11. An assembly as recited in claim 8, wherein the assembly housing includes a face plate secured to the distal end of the body, the face plate including a central aperture sized for receipt of the rotor shaft, and a cutout through which the LED emits light.

12. An assembly as recited in claim 11, further comprising a pair of positioning pins that engage the stator and prevent contact between the stator and the permanent magnet during rotation of the rotor shaft, the positioning pins each being supported by the face plate and presenting a shoulder that engages the stator when the face plate is secured to the body to position the stator axially within the assembly.

13. A generator and lighting assembly for use on a mechanism having a shaft that is rotated during use of the mechanism, the assembly comprising:

a rotor including a rotor shaft affixed to the mechanism shaft, and a permanent magnet supported on the rotor shaft for rotation therewith;

a stator including a stator body presenting pair of electrically conductive arms extending on opposite sides of the rotor and an electrically conductive shank connecting the arms together, and a winding of electrically conductive wire supported on the body and presenting a pair of opposed ends;

a lamp including a light emitting diode (LED) embedded in a solid transparent bulb formed of a synthetic resin composition; and electrical conductors connecting the ends of the winding to the LED to form a circuit for supplying current to the LED upon rotation of the rotor within the stator.

14. A generator and lighting assembly as recited in claim 13, further comprising an assembly housing secured to the mechanism for supporting the stator and the LED on the mechanism.

15. A generator and lighting assembly as recited in claim 13, wherein a plurality of lamps are provided, each including an LED embedded in a solid transparent bulb formed of a synthetic resin composition, and each including a base presenting a pair of electrical contacts adapted to be connected to the electrical conductors of the assembly.

16. A generator and lighting assembly as recited in claim 13, further comprising an extension cord extending between and connecting the lamp and the electrical conductors of the assembly so that the position of the lamp can be adjusted relative to the mechanism.

* * * * *